April 7, 1970  A. R. BREED  3,504,722
THREAD FORMING AND LOCKING FASTENER
Filed Nov. 20, 1968  2 Sheets-Sheet 1
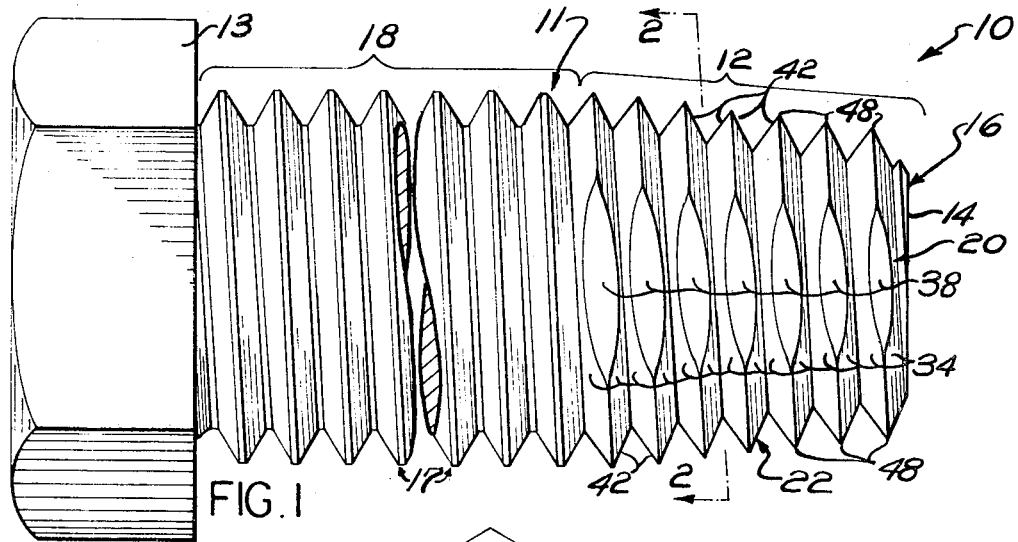
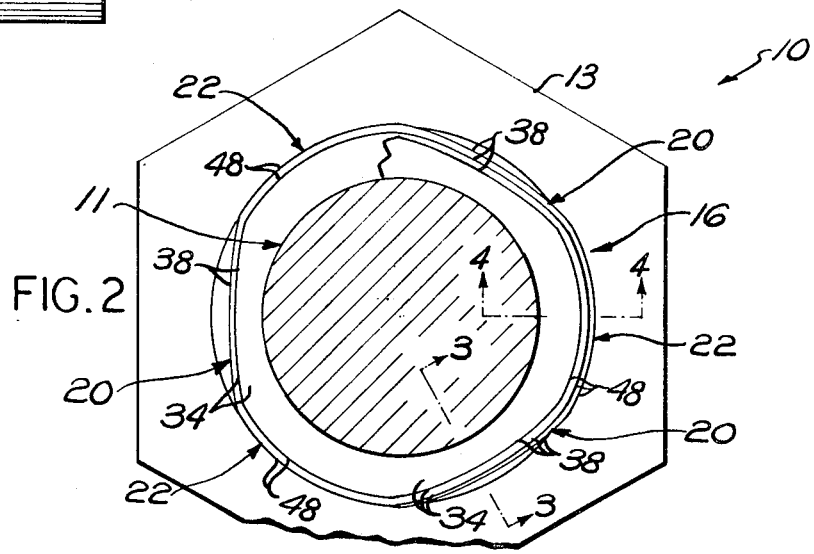
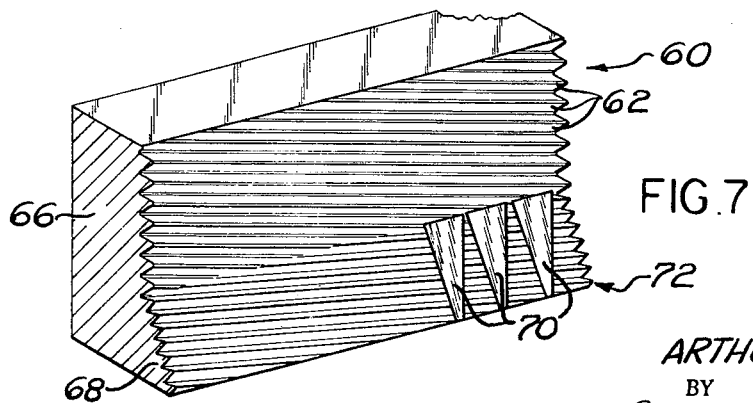
INVENTOR.
ARTHUR R. BREED
BY
Yount, Flynn & Tarolli
ATTORNEYS INVENTOR.
ARTHUR R. BREED
BY
Young, Flynn & Tarolli
ATTORNEYS .# United States Patent Office 3,504,722
Patented Apr. 7, 1970

3,504,722
THREAD FORMING AND LOCKING FASTENER
Arthur R. Breed, Euclid, Ohio, assignor to The Lamson
& Sessions Co., Cleveland, Ohio, a corporation of Ohio
Filed Nov. 20, 1968, Ser. No. 777,220
Int. Cl. F16b 33/02, 39/30
U.S. Cl. 151—22
15 Claims

ABSTRACT OF THE DISCLOSURE

An improved threaded fastener includes a thread convolution having wide flank portions. Interspersed with these wide flank portions are high crest portions having a narrower flank width and greater crest height than the wide flank portions. In one embodiment, the thread convolution is located on a tapering, leading end of the fastener and is adapted to form a cooperating internal thread in the receiving opening in a host member. In another embodiment, the thread convolution is located on a cylindrical shank of the fastener and establishes a prevailing torque for relative rotation between the fastener and an internally threaded member. The improved thread is formed by applying pressure to the crest of a thread convolution at circumferentially spaced locations along the thread convolution.

---

The present invention relates to a threaded fastener and method of making the same, and in particular to a thread convolution adapted to either form threads on a member or to lock a fastener against rotation relative to a threaded member.

It is the object of this invention to provide a new and improved threaded fastener and method of making the same wherein the fastener has a thread convolution which is easily and economically produced, and which is adapted to form threads on a member under the influence of a relatively low driving torque, as compared to other self-tapping threads, to thereby substantially minimize thread striping and breakage of the fastener.

Another object of this invention is to provide a self-tapping fastener having a new and improved thread convolution for locking the fastener against rotation relative form a mating thread by the provision of a series of portions for forming the flanks of the mating thread interspersed with a series of portions for forming and deepening the root of the mating thread.

Another object of this invention is to provide a fastener having a new and improved external thread convolution for forming an internal thread on a side wall of a member wherein the external thread convolution includes a plurality of wide flank portions for forming the flanks of the internal thread without interfering with the root of the internal thread interspersed with a plurality of high crest portions for forming the root of the internal thread without interfering with the flanks of the internal thread.

Another object of this invention is to provide a new and improved fastener and method of making the same wherein the fastener has a thread convolution which is easily and economically produced, and which is adapted to provide interfering engagement with a mating standard thread convolution on a member to retard relative rotation between the thread convolutions.

Another object of this invention is to provide a self-locking fastener having a new and improved thread convolution for locking the fastener against rotation relative to a threaded member by the provision of a series of spaced apart portions for interfering engagement with the flanks of a mating thread.

Another object of this invention is to provide a fastener having a new and improved thread convolution for locking engagement with a mating thread convolution on a member, wherein the improved thread convolution includes a plurality of wide flank portions for interfering engagement with the flanks of the mating thread convolution interspersed with a series of high crest portions to thereby retard relative rotation between the thread convolutions.

Another object of this invention is to provide a new and improved method of making a fastener including the steps of forming a thread convolution on a blank and applying pressure to the crest of the thread convolution at a plurality of circumferentially spaced locations along the thread convolution to thereby reduce the crest height and increase the flank width of the thread convolution at these locations.

These and other objects and features of this invention will become more apparent upon a consideration of the following description taken in connection with the accompanying drawings wherein:

FIG. 1 is a schematic illustration of a fastener having a self-tapping thread constructed in accordance with the present invention;

FIG. 2 is a sectional view, taken along the line 2—2 of FIG. 1, further illustrating the structure of the fastener;

FIG. 7 is a schematic pictorial illustration of a die for forming the thread of FIG. 1.

Figure 3:
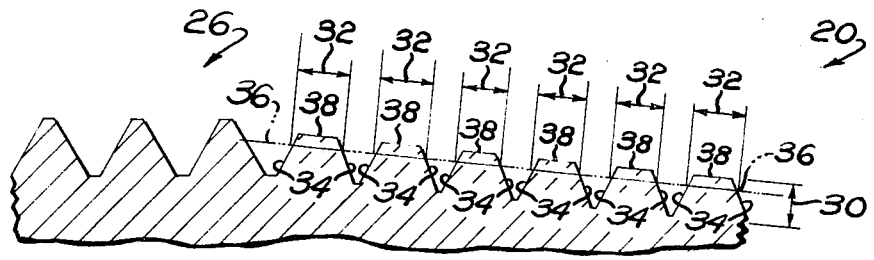
FIG. 3 is a sectional view, taken on an enlarged scale along the line 3—3 of FIG. 2, illustrating the configuration of wide flank portions of the self-tapping thread.

The present invention provides a self-tapping thread which is adapted to form a mating thread on a member with a minimum of driving torque. To minimize driving torque required during a thread forming operation, each convolution of the self-tapping thread includes a plurality of wide flank portions for forming the flanks of the mating thread and high-crest portions for forming and deepening the root of the mating thread. The crest height of the wide flank portions is less than that of the high crest portions so that the wide flank portions do not interfere with the root of the mating thread. Similarly, the flank width of the high crest portions is relatively narrow so that the high crest portions do not interfere with the flanks of the mating thread. This construction of the self-tapping thread convolution minimizes thread stripping and breakage of the fastener by reducing the driving torque required during a thread forming operation.

A self-tapping fastener 10 includes a shank 11 having an end portion 12 which tapers away from a head 13 toward a leading end 14 of the fastener. A thread 16, on the tapering end portion 12, is adapted to form an internal thread on the side of the hole or other opening in a member. Once an internal thread has been formed by the thread 16, the internal thread is engaged by a standard thread 17 formed on a cylindrical portion 18 of the shank 11.

To minimize the driving torque required to form an internal thread on the side of the opening, the thread 16 includes portions which form the flanks of the internal thread and are spaced from or clear the root of the internal thread to thereby eliminate unnecessary interference and binding between the internal and external threads. The driving torque is further reduced by the provision of portions which do not interfere with or clear the flanks of the internal thread while forming and deepening the root of the internal thread through interfering engagement therewith. To this end, the thread 16 is comprised of a plurality of convolutions each of which includes wide flank portions 20 which are interspersed with high crest portions 22 (see FIGS. 1 and 2). The provision of the alternating wide flank and high crest portions on each convolution of the thread 16 results in the flanks of the internal thread being formed by the wide flank portions 20 which clear or are spaced from the root of the internal thread. The root of the internal thread is formed and deepened by the high crest portions 22 which clear or are spaced from the flanks of the internal thread.

The wide flank portions 20 reduce the torque required to turn the fastener 10 during the formation of internal threads on a side of a hole or opening in a member by effectively preventing interference between the flanks of the internal thread and the flanks of the high crest portions 22 of the external thread 16. In addition, the wide flank portions 20 are truncated so as to have a relatively small or low crest height (indicated at 38 in FIG. 3) to effectively prevent interference between the crest of the wide flank portion 20 and the root of the internal thread during the formation of the flanks of the internal thread. Accordingly, the flank or metal width 32 between flank surfaces 34 of the wide flank portions 20 (see FIG. 3) is greater than the flank or metal width for a standard thread measured along a pitch cone, indicated at 36 in FIG. 3, for the standard thread. The relatively large flank width 32 of the wide flank portions 20 results in the flanks 37 (see FIG. 6) of an internal thread being formed by the flank surfaces 34 as the fastener 10 is rotated relative to a member on which the internal threads are being formed. The truncated configuration of the wide flank portions 20 enables the radially outer surface or crest 38 of the wide flank portions to clear the root 39 (FIG. 6) of the internal thread.

Figure 4:
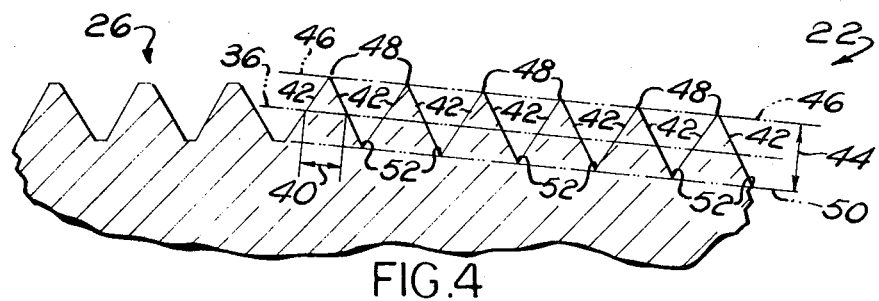
FIG. 4 is a sectional view, taken on an enlarged scale along the line 4—4 of FIG. 2, illustrating the structure of high crest portions of the self-tapping thread.
Figure 5:
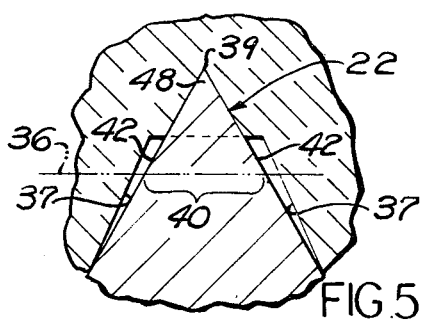
FIG. 5 is a schematic fragmentary sectional view, on an enlarged scale, illustrating the formation of the root of a mating internal thread by a high crest portion of the self-tapping thread of FIG. 1.

The high crest portions 22 reduce the torque required to turn the fastener 10 during the formation of an internal thread by effectively preventing interference between the root 39 of the internal thread and the crests 38 of the wide flank portions 20. In addition, the high crest portions 22 have a relatively small flank or metal width (indicated at 40 in FIG. 4) to effectively prevent interference between flank surfaces 42 of the high crest portions 22 and the flank surfaces 37 of the internal thread (see FIG. 5). Thus, the high crest portions 22 have a flank width 40, along the pitch cone 36 for a standard thread (see FIG. 4), which is less than the flank width of the wide flank portions 20 along the same pitch cone. In the illustrated embodiment of the invention, the flank surfaces 40 of the high crest portion have an included angle which is equal to the included angle of the standard thread 17 while the flank surfaces 34 of each of the wide flank portions 20 have an included angle which is greater than the included angle between flank surfaces of a standard thread.

The high crest portions 22 reduce the resistance of the self-tapping fastener 10 to rotation by effectively eliminating interference between the root of the internal thread and the crests of the wide flank portions 20 in the manner previously explained. To this end, the high crest portions 22 have a relatively large crest height or distance 44 between a sharp major cone 46 through the apex of the peaked crests 48 and a sharp minor cone 50 through the apex of the root 52 (see FIG. 4). Thus, the crests 38 of the truncated wide flank portions 20 are radially inwardly or below the peaked crests 48 of the circumferentially adjacent high crest portions 22. The root 39 of the internal thread is therefore formed by the crests 48 of the high crest portions 22 (FIG. 5) and is spaced from the crests 38 of the wide flank portions 20 (FIG. 6) to reduce resistance of the fastener 10 to rotation as the internal thread is being formed.

In order to promote a smooth and even formation of an internal thread on a member, the crests 38 of the wide flank portions 20 taper circumferentially and radially outwardly to the peaked crests 48 of the high crest portions 22 (see FIGS. 1 and 2). This circumferential tapering of the crests 38 of the wide flank portions 20 provides a smooth transition between the high crest portions 22, which form the root of the internal thread, and the wide flank portions 20, which form the flanks of the internal thread. Since the thread 16 is formed on the tapering end portion 12 of the shank 11, the crests 38 of the wide flank portions and the crests 48 of the high crest portions have a decreasing circumferential extent in a direction toward the leading end 14 of the fastener 10. In the illustrated embodiment of the invention the crests 38 of the wide flank portions 20 are convex (FIG. 2). However, it is contemplated that these crests could be made flat or given a slight inward curvature.

The standard thread 26 and self-tapping thread 16 are economically formed in a single operation by means of a rolling die 60 (FIG. 7). The die 60 includes a plurality of grooves 62 having a configuration corresponding to that of a standard thread, that is, any known thread for providing a non-interfering engagement with a cooperating thread. The die 60 includes a main body portion 66 for forming continuous thread convolutions on the cylindrical portion 18 of the fastener 10. An outwardly sloping end portion 68 is provided for continuing the thread convolutions on the tapered portion 12 of the fastener. When the die 60 is moved relative to a stationary cooperating die, the standard thread 17 is formed in a known manner of the shank portion 11 of the fastener contemporaneously with standard thread convolutions on the tapering end portion 12. A plurality of generally trapezoidally shaped raised inserts 70 are provided at a trailing end 72 of the outwardly projecting portion 68 of the die 60 to form the wide flank portions 20 and high crest portions 22 of the fastener. The raised inserts 70 form the wide flank portions 20 by applying a generally radially inwardly directed pressure to the crest of the standard thread formed on the tapered end 12 of the fastener 10. This radial pressure reduces the crest height and increases the flank width of the portions of the standard thread convolution engaged by the inserts 70 to thereby form the wide flank portions 20.

Figure 6:
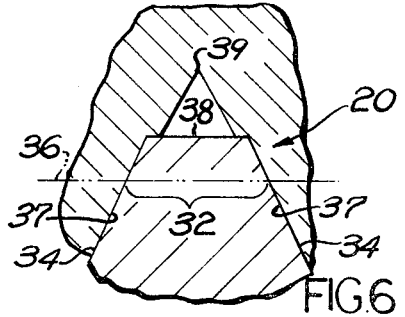
FIG. 6 is a schematic fragmentary sectional view, on an enlarged scale, illustrating the formation of the flanks of a mating internal thread by a wide flank portion of the self-tapping thread of FIG. 1.

The flank surfaces 34 of the wide flank portions 20 are unrestrained during this formation of the wide flank portions 20 by the raised inserts 70. This results in a free axially outward flow of metal to form the flank surfaces 34. The included angle between extensions of adjacent flank surfaces of any one of the wide flank portions 20 is greater than the included angle between flank surfaces of a standard thread. Although it is preferred to form the wide flank portions 20 with the flanks 34 unrestrained so that they will appear as shown in FIGS. 3 and 6, it is contemplated that the die 60 could be constructed in such a manner as to restrain the flank surfaces 34 against outward movement to form flank surfaces of a different configuration.

Figure 8:
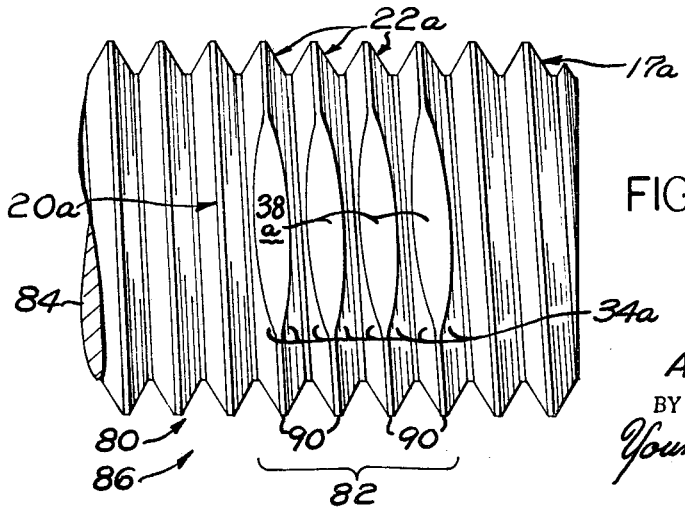
FIG. 8 is a fragmentary schematic illustration of a fastener having a lock thread, similar to the self-tapping thread of FIG. 1, for retarding relative rotation between the fastener and an internally threaded member.

In the embodiment of the invention illustrated in FIG. 8, a lock thread 80 is schematically illustrated on a generally cylindrical portion 82 of the shank 84 of a self-locking fastener 86. With the exception of being formed on the cylindrical portion 82 of the shank 84, the lock thread 80 is generally similar in shape to the self-tapping thread 16. Therefore, in order to avoid needless prolixity of description, numerals similar to those used in connection with FIGS. 1-6 will be used to designate similar parts of the lock thread convolution 80, the suffix letter $a$ being added to the numerals designating the parts of the lock thread convolution 80 to avoid confusion.

In order to hold the fastener 86 against rotation relative to an internally threaded member, each convolution of the lock thread 80 includes a plurality of wide flank portions 20a interspersed with a plurality of high crest portions 22a. The wide flank portions 20a have opposite flank surfaces 34a. These wide flank portions 20a are formed by applying radially inwardly directed pressure to the crest of a standard thread convolution at circumferentially spaced locations to form circumferentially and radially outwardly tapering surfaces 38a in a manner similar to that previously explained in connection with the formation of the wide flank portions 20 of FIGS. 1 and 3.

In the illustrated embodiment of the invention, the wide flank portions 20a and high crest portions 22a are a continuation of a standard thread 17a and the high crest portions 22a have flats 90 corresponding to those on a known standard thread convolution. Thus, the crests of the high crest portions 22a do not interfere with the root of the mating standard internal thread. However, if desired, the high crest portions 22a could be formed with a peaked crest, similar to the crest 48 of the high crest portions 22 of FIG. 4, so that the high crest portions 22a would interfere with the roots of the mating internal thread.

When the fastener 86 is brought into engagement with an internal thread, the standard external thread 17a on the cylindrical shank of the fastener 86 is freely rotatable relative to the internal thread until a leading convolution of the lock thread 80 is brought into engagement with the internal thread. When the lock thread 80 engages the standard internal thread, the flanks 34a of the wide flank portions 20a interfere with the flanks of the internal thread and cause metal to flow inwardly over the radially outer surfaces or crests 38a of the wide flank portions 20a. This metal then engages the crests 38a to retard relative rotation between the fastener 86 and the internally threaded member. If the high crest portions 22a are formed with peaked crests, similar to the crests 48 of FIG. 4, the high crest portions 22a will interfere with the root of the internal thread convolution and further lock the fastener 86 against rotation relative to the internally threaded member. However, even if the high crest portions 22a do not interfere with the root of the internal thread, the wide flank portions 20a provide sufficient interference with the flanks of the internal thread to securely retain the fastener 86 against rotation relative to the internally threaded member.

In view of the foregoing description, it can be seen that I have provided a thread convolution 16 which can be located on an inwardly tapering leading end portion 12 of a fastener to form threads on a wall of an opening in a member. When the thread convolution is located on a cylindrical portion of the shank of a fastener, a lock thread convolution 80 is provided for holding the fastener against rotation relative to the internally threaded member. Of course, a single fastener could be provided with both the self-tapping thread 16 on a tapering leading end of the fastener and with the lock thread 80 on a cylindrical trailing portion of the shank of the fastener. In addition it is contemplated that a thread convolution constructed in accordance with the present invention could be used in conjunction with a self-tapping or locking fastener which is internally threaded.

The lock thread 80 and the self-tapping thread 16 are easily and economically formed by first rolling a continuous standard thread throughout the entire length of the shank of the fastener. Pressure is then applied to the crest of the standard thread at circumferentially spaced locations to form the wide flank portions 20 and 20a by pressing the crest inwardly. This bulging of the flanks 34 and 34a provides truncated, relatively wide flank portions which, when located on a tapering leading end of a fastener, form the flanks of an internal thread. When these wide flank portions are located on a cylindrical part of the shank of the fastener, the wide flank portions are adapted to interfere with the flanks of a standard internal thread to retard relative rotation between the fastener and the internally threaded member.

Having described my invention I claim:

1. A thread forming fastener for forming a mating internal thread on a side wall of an opening in a member, said fastener comprising a body having a shank with a portion which tapers inwardly in a direction toward a leading end of said body, and a thread convolution on said tapering portion of said shank, said thread convolution including a plurality of wide flank portions for forming the flanks of the internal thread on said member and a plurality of high crest portions for forming the root of the internal thread on said member, said high crest portions having a greater crest height and narrower flank width than said wide flank portions and being interspersed between said wide flank portions whereby there is relatively little interference between the crests of said wide flank portions and the root of the internal thread and realtively little interference beween the flanks of said high crest portions and the flanks of the internal thread to thereby facilitate the formation of the internal thread.

2. A thread forming fastener as set forth in claim 1 wherein said shank includes a generally cylindrical portion with a standard thread convolution thereon for engaging the internal thread formed by the thread convolution on the tapering portion of said shank, said standard thread convolution being a continuation of said thread convolution on the tapering portion of said shank.

3. A thread forming fastener as set forth in claim 1 wherein said wide flank portions are truncated and said high crest portions are peaked.

4. A thread forming fastener as set forth in claim 1 wherein said wide flank portions and said high crest portions have substantially flat flank surfaces.

5. A thread forming fastener as set forth in claim 1 wherein said wide flank portions are truncated with generally circumferentially extending outer surfaces which taper toward the crests of the adjacent high crest portions.

6. A thread forming fastener as set forth in claim 5 wherein said outer surfaces of the truncated wide flank portions are generally arcuate in shape.

7. A thread forming fastener as set forth in claim 5 wherein said outer surfaces decrease in circumferential extent toward the leading end of said body.

8. A thread forming fastener as set forth in claim 1 wherein said wide flank portions and said high crest portions decrease in circumferential extent toward the leading end of said body.

9. A thread forming fastener for forming a mating internal thread on a side wall of an opening in a member, said fastener comprising a body having a shank with a generally cylindrical portion and a portion which tapers inwardly from said cylindrical portion toward a leading end of said body, a thread forming convolution formed on said tapering portion of said shank for forming the internal thread on said member, and a standard thread convolution formed on said cylindrical portion of said shank for engaging the internal thread on said member, said thread forming convolution being a continuation of said standard thread convolution and having a plurality of truncated wide flank portions for forming the flanks of the internal thread and a plurality of peaked high crest portions for forming the root of the mating thread, said high crest portions having substantially flat flank surfaces with an included angle between flank surfaces of a high crest portion being less than the included angle between extensions of the flank surfaces of a wide flank portion whereby there is relatively little interference between the crests of said wide flank portions and the root of the internal thread and relatively little interference between the flanks of the high crest portions and the flanks of the internal thread to thereby facilitate the formation of the internal thread.

10. A fastener as set forth in claim 9 wherein the flank surfaces of said wide flank portions are generally flat.

11. A threaded fastener for cooperating with a mating thread on a threaded member, said fastener comprising a body and a thread convolution formed on a portion of said body, said thread convolution including a plurality of wide flank portions for interfering with the flanks of the mating thread on the threaded member and a plurality of high crest portions for interfering with the root of a mating thread, said wide flank portions having a width between flanks which is wider than the width between the flanks of a standard thread and a crest height which is smaller than the crest height of a standard thread so that there is relatively little interference between the crests of the wide flank portions and the root of the mating thread and substantial interference between the flanks of the wide flank portions and the flanks of the mating thread, said high crest portions having a width between flanks which is narrower than the width between the flanks of a standard thread and a crest height which is greater than the crest height of a standard thread so that there is relatively little interference between the flanks of the high crest portions and the flanks of the mating thread and substantial interference between the crests of the high crest portions and the root of the mating thread, said high crest portions being interspersed between said wide flank portions so that there is alternate interference between the flanks and root of the mating thread and the flanks and crest of said thread convolution on said fastener.

12. A fastener as set forth in claim 11 wherein said wide flank portions are truncated and said high crest portions have substantially flat flank surfaces located inwardly of flank surfaces of said wide flank portions.

13. A fastener as set forth in claim 11 wherein said wide flank portions are truncated with generally circumferentially extending outer surfaces which tapered toward the crests of the adjacent high crest portions.

14. A fastener as set forth in claim 13 wherein said outer surfaces of the truncated wide flank portions are arcuately shaped in a circumferential direction.

15. A fastener as set forth in claim 11 wherein said wide flank portions and said high crest portions have substantially equal circumferential extents.

References Cited

UNITED STATES PATENTS

| | | | |
|---|---|---|---|
| 2,371,365 | 3/1945 | Tomalis et al. | 151—22 X |
| 3,076,208 | 2/1963 | Moore | 151—22 X |
| 3,134,115 | 5/1964 | Moore et al. | 151—22 X |
| 3,186,464 | 6/1965 | Baumle | 151—22 |

RAMON S. BRITTS, Primary Examiner

U.S. Cl. X.R.

10—10; 85—47